United States Patent [19]
Besser et al.

[11] Patent Number: 5,670,931
[45] Date of Patent: Sep. 23, 1997

[54] METHOD AND APPARATUS FOR TRANSMITTING DATA OVER A POWER CABLE UTILIZING A MAGNETICALLY SATURABLE CORE REACTOR

[75] Inventors: Gordon Lee Besser, Claremore, Okla.; Cecil Glynn Davis, Dallas; Edward Bryant Tickell, Jr., Crowley, both of Tex.; Dick Lee Knox, Claremore, Okla.; John Dee Martin, Jr., Richmond, Tex.

[73] Assignee: Baker Hughes Incorporated, Houston, Tex.

[21] Appl. No.: 262,807

[22] Filed: Jun. 17, 1994

[51] Int. Cl.$^6$ .................................................. H04M 11/04
[52] U.S. Cl. ........................... 340/310.01; 340/310.04; 340/310.07; 340/853.1; 340/855.2; 340/855.9; 166/250; 175/50
[58] Field of Search ................ 340/310.01, 310.02, 340/310.04, 310.07, 853.1, 854.9, 855.2, 855.9; 166/250; 175/50

[56] References Cited

U.S. PATENT DOCUMENTS

| | | | |
|---|---|---|---|
| 3,340,500 | 9/1967 | Boyd et al. | 340/18 |
| 4,027,286 | 5/1977 | Marosko | 340/310.02 |
| 4,121,113 | 10/1978 | White et al. | 340/310.07 |
| 4,157,535 | 6/1979 | Balkanli | 340/310.07 |
| 4,300,126 | 11/1981 | Gajjar | 340/310.04 |
| 4,658,238 | 4/1987 | Mak | 340/310 |
| 4,714,912 | 12/1987 | Roberts et al. | 340/310.04 |
| 4,766,414 | 8/1988 | Shuey | 340/310.07 |
| 4,837,556 | 6/1989 | Matsushita et al. | 340/310.01 |
| 4,973,940 | 11/1990 | Sakai et al. | 340/310.02 |
| 4,988,972 | 1/1991 | Takagi | 340/310 |
| 5,210,519 | 5/1993 | Moore | 340/310.07 |

FOREIGN PATENT DOCUMENTS

| | | | |
|---|---|---|---|
| 0018334 A1 | 10/1980 | European Pat. Off. | H04B 3/54 |
| 1 500 891 | 2/1978 | United Kingdom | H04B 3/54 |
| 2 159 377 | 11/1985 | United Kingdom | H04B 3/54 |
| 2 197 568 | 5/1988 | United Kingdom | H04B 3/54 |
| WO 92/06552 | 4/1992 | WIPO | H04M 11/04 |

OTHER PUBLICATIONS

Wm. M. Flanagan, "Handbook of Transformer Applications," 1986.

David K. Chang, "Field and Wave Electromagnetics" 1989, p. 311.

P.C. Sen, "Principles of Electric Machines and Power Electronics," pp. 522–529.

Steve Smith, "Magnetic Components," 1985, pp. 76–104.

G.E. Lynn et al., "Self-saturating Magnetic Amplifiers," 1960 pp. ix–73; pp. 444–449.

Wm H. Geyger, "Nonlinear–Magnetic Control Devices," 1964 pp. 1.1; 14–27; 96–117.

*Primary Examiner*—Thomas Mullen
*Assistant Examiner*—Nina Tong
*Attorney, Agent, or Firm*—Melvin A. Hunn; Barry J. Bumgardner

[57] ABSTRACT

The present invention impresses the data on the power signal by utilizing a saturable core reactor. The saturable core reactor uses two cores. Each core has both load windings and control windings. The control windings are selectively energized to alter an electrical characteristic of the current passing through the load windings. The saturable core reactor is designed with cores made of a highly magnetically permeable material so that the cores are easily saturated. The cyclical saturation of the cores achieved by the load current, and the selective saturation of the cores achieved by selectively applying a control current, results in "deformations" being selectively formed at the zero crossings of the load current waveform. These "deformations" can be selectively formed on the power signal to represent a binary data stream. Once the series of "deformations" is impressed onto the power signal, the "deformations" are communicated from one point on the power cable to another point on the power cable together with the power signal. The "deformations" are then read and transformed into a binary data stream. Thus, the power cable is converted from a mere power cable to a power cable capable of transmitting both power and data simultaneously.

48 Claims, 7 Drawing Sheets

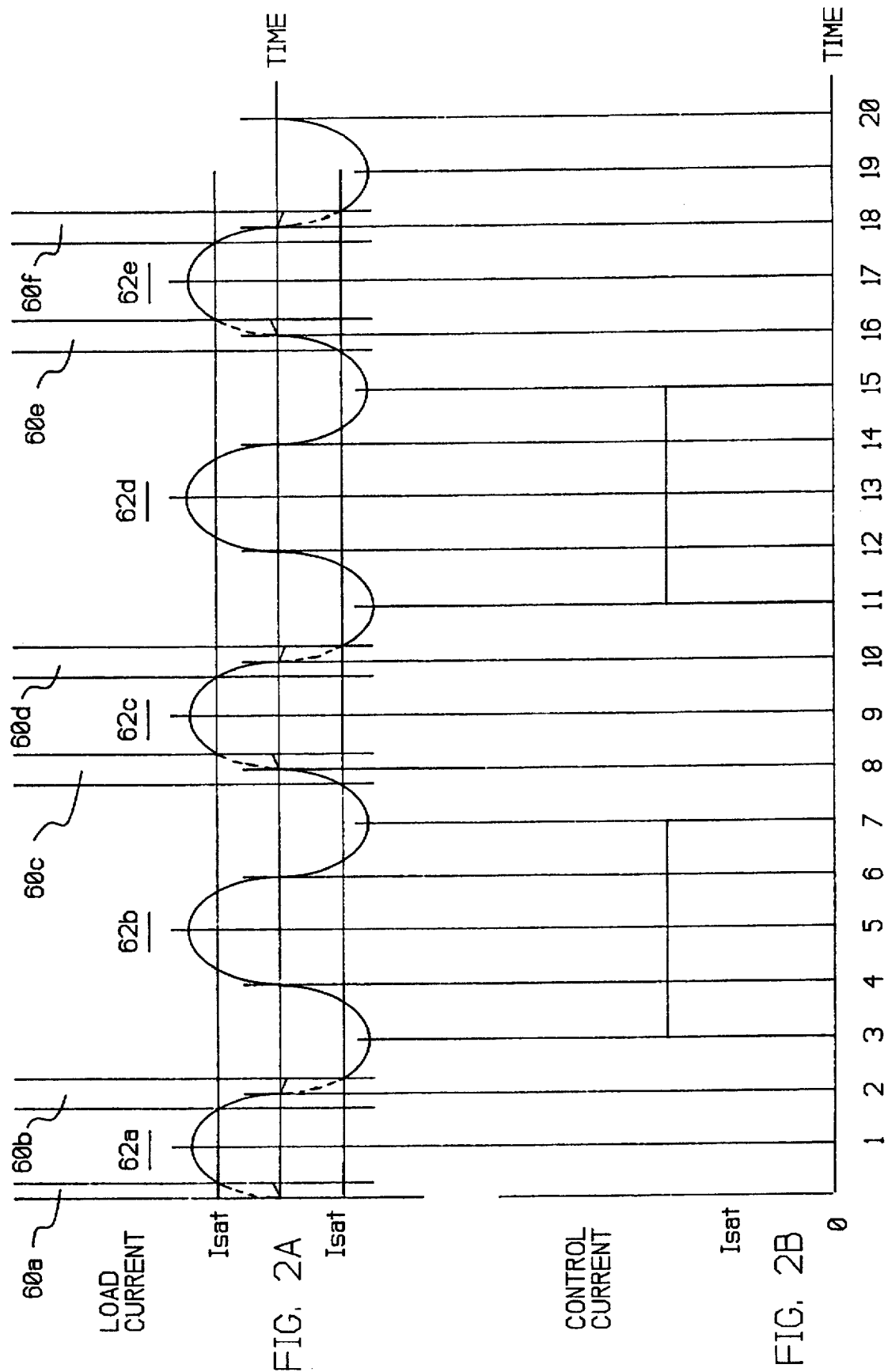

METHOD AND APPARATUS FOR TRANSMITTING DATA OVER A POWER CABLE UTILIZING A MAGNETICALLY SATURABLE CORE REACTOR

BACKGROUND OF THE INVENTION

1. Field of the Invention

The present invention relates in general to the transmission of data over a power cable, and in particular relates to the transmission of data in a wellbore over a power cable.

2. Description of the Prior Art

The economical transmission of data within a producing oil and gas wellbore has been one long recognized goal in the oil and gas industry. This is particularly true since data gathered from locations deep within the subterranean wellbore can be utilized to (a) optimize production of oil and gas from the wellbore, and (b) monitor the operation of remotely located subsurface equipment such as submersible pumps to prolong the service life of the equipment and avoid damaging the equipment or the wellbore by being unable to identify impending failures.

Since a producing oil and gas wellbore typically extends several thousand feet downward from the surface, with a fixed radial dimension, the utilization of a dedicated hardwire for the transmission of data accumulated in a subterranean location is not practical from an engineering viewpoint. Typically, a cable is however provided to energize wellbore components such as submersible pumps. The lack of clearance for an additional cable, as well as the associated cost of a dedicated data cable, has resulted in numerous attempts in the prior art to superimpose a data signal upon the power cable for the power consuming subterranean device. Unfortunately, many of the solutions offered by the prior art involve the utilization of delicate electronic components which are not likely to withstand prolonged exposure to the high temperature, high pressure wellbore environments, nor the corrosive fluids and gases which are frequently present within wellbores. One additional problem with prior art solutions is that the superimposition of the data stream onto the power signal results in an inefficient power distribution which may damage the subterranean power consuming device.

There exists a great need for a data transmission system which can be used in a wellbore under the hostile conditions encountered therein, but which does not unnecessarily interfere with the distribution of power to the subterranean power consuming devices.

SUMMARY OF THE INVENTION

The present invention allows a power cable to supply power, while at the same time serving as a databus for transmitting data between two locations. In the oil and gas industry, it is often necessary to transmit data from a remote wellbore location to the surface. Although this can be achieved by using a cable dedicated to data transmission, it would be highly advantageous to be able to transmit data over an existing power cable which is already suspended from the surface down to the remote location.

When transmitting data over a power cable, it is important to avoid significant alteration of the power signal. Significant alteration of the power signal will result in poor power transfer and poor power distribution which can cause malfunctioning of the equipment being powered. Thus, the present invention only alters the power signal at points near the zero crossing of an alternating current power signal. Since very little power is being transmitted at such points, such alteration results only in minimal alteration of the power being transmitted by the power cable.

The present invention is directed to a data transmission apparatus for transmitting data over power cable which supplies alternating electric current to an electrical-power-consuming component. The data transmission apparatus includes at least one alternating-electrical-current modifying circuit component. Each of these includes an alternating electrical current input, and an alternating electrical current output. A control circuit is provided for selectively communicating a data signal to the at least one alternating-electrical-current-modifying circuit component, for modifying the alternating electrical current as it passes through the at least one alternating electrical-current-modifying circuit component. Data is then transmitted to a remote location through the power cable through alteration of at least one electrical characteristic of the alternating electrical current in a predefined manner by switching action of the control circuit in response to a data signal. More particularly, in accordance with a preferred embodiment of the present invention, the alternating electrical current is altered in at least one zero-crossing region in a predefined manner by the switching action of the control circuit. This minimizes the disruption of power transfer to the electrical-power-consuming component.

More particularly, the present invention impresses the data on the power signal by utilizing a saturable core reactor. The saturable core reactor uses two cores. Each core has both load windings and control windings. The control windings are selectively energized to alter an electrical characteristic of the current passing through the load windings. The saturable core reactor is designed with cores made of a highly magnetically permeable material so that the cores are easily saturated. The cyclical saturation of the cores achieved by the load current, and the selective saturation of the cores achieved by selectively applying a control current, results in "deformations" being selectively formed at the zero crossings of the load current waveform. These "deformations" can be selectively formed on the power signal to represent a binary data stream. Once the series of "deformations" is impressed onto the power signal, the "deformations" are communicated from one point on the power cable to another point on the power cable together with the power signal. The "deformations" are then read and transformed into a binary data stream. Thus, the power cable is converted from a mere power cable to a power cable capable of transmitting both power and data simultaneously.

A significant advantage of the present invention is that it allows data transmission over a cable which is also being used to carry electrical power. The present invention allows simultaneous data and power transmission, thereby eliminating the need of a separate means of transmitting the data.

Another significant advantage of the present invention is that the transmission equipment is relatively uncomplicated and durable, which is especially important for use in extremely hostile environments within which remotely located wellbore equipment (such as pumps) is expected to perform for prolonged time periods.

Additional objects, features, and advantages will be apparent in the written description which follows.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

FIGS. 2A and 2B are timing diagrams in which FIG. 2A is a graph of load current versus time and FIG. 2B is a graph of control current versus time, both shown over the same period of time.

DETAILED DESCRIPTION OF THE INVENTION

Figure 1A:
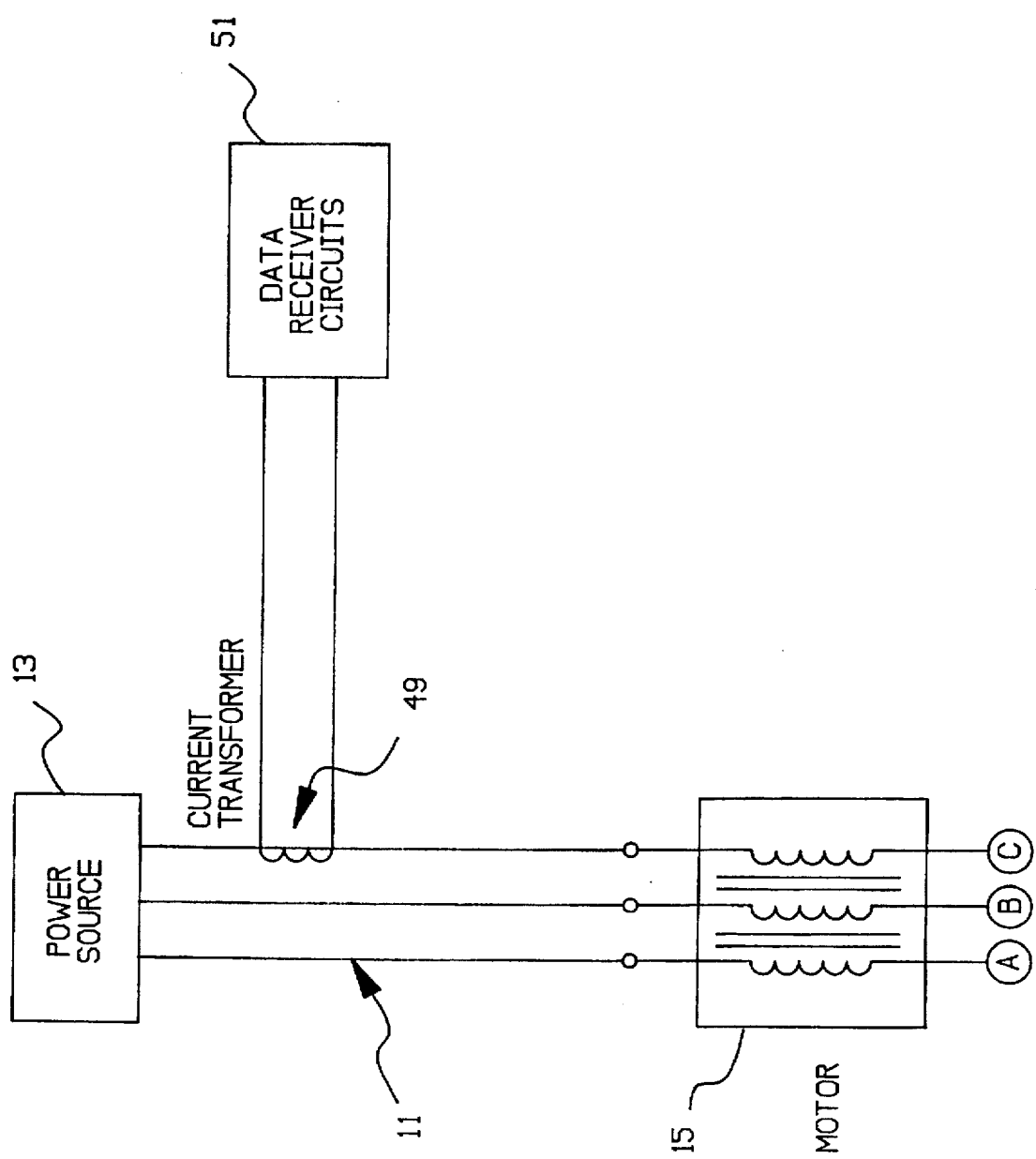
FIGS. 1A and 1B together provide a schematic and block diagram representation of the circuit components of an embodiment of the present invention.
Figure 1B:
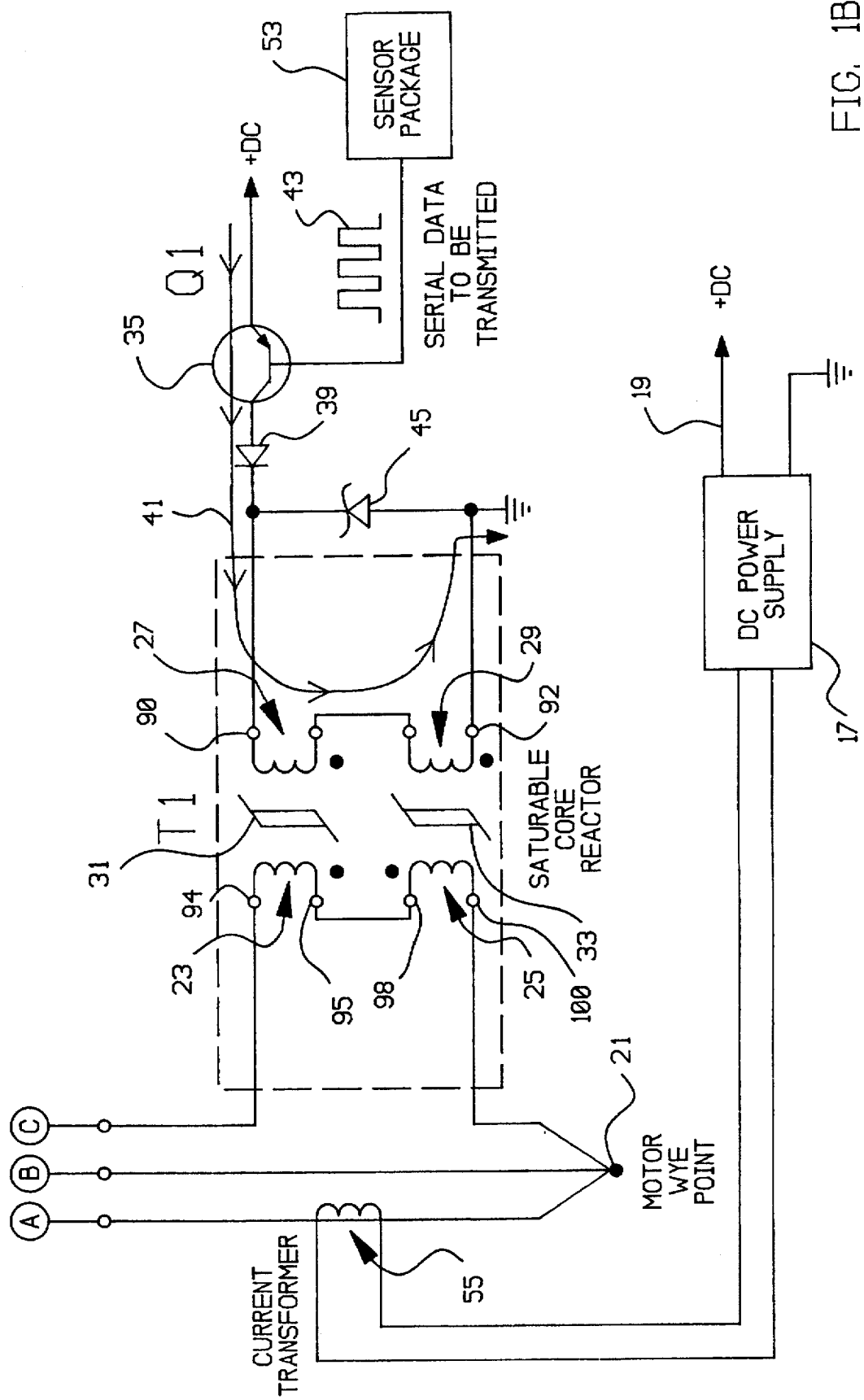

The present invention is best understood in the context of the following illustrative embodiment. FIGS. 1A and 1B together provide a schematic and block diagram representation of the circuit components of an embodiment of the present invention. As is shown, a power source 13 is located at the earth's surface. A three-phase power cable 11 extends from the power source 13 to a remote wellbore location to supply power to a submersible pump motor such as motor 15. A current transformer 55 is magnetically coupled to one of the wires which come together at motor WYE point 21, and serves to provide an input for DC power supply 17. DC power supply 17 provides as an output a regulated DC current level 19 which operates to power the remaining subsurface circuit components.

A number of inductive windings are provided about two saturable magnetic cores. As shown, windings 23, 25, 27, and 29 are provided, with windings 23 and 27 disposed about saturable core 31, while windings 25 and 29 are disposed about saturable core 33. Windings 23 and 25 are load windings and are connected to one of the legs of the three-phase power cable 11. Windings 27 and 29 are control windings and are connected to the control circuit and the sensor package 53. (It should be noted that although the control windings are referred herein as being two separate sets of windings 27 and 29, the preferred embodiment, as will be described later, actually uses only one winding disposed about both cores. Having two windings 27 and 29 one around each core, or one winding around both cores gives the same results).

Cores 31 and 33 are formed of a magnetically permeable material. In the preferred embodiment of the present invention, cores 31 and 33 are formed of at least fifty percent nickel, which allows for easy saturation of the cores.

Conventional reactors are normally designed so that the AC current passing through the windings results in fluxes in the core that have a peak value which just fails to saturate the core. Such reactors offer a high resistance (or impedance) to the alternating current passing through the load windings. This is due to the core being in an unsaturated condition. In an unsaturated condition, current will lag behind voltage by 90 degrees.

However, if a core is operated in a saturated condition, the effective resistance at the load windings would approach zero. The saturable core reactor used in the present invention differs from ordinary reactors in that it is designed so that the AC current passing through the load windings results in fluxes in the cores that easily saturate the cores. Such a design results in the cores being saturated for the majority of each power cycle, thereby offering low resistance at the load windings for the majority of each power cycle.

The cores in a saturable core reactor can be saturated in either of two ways. The first way is to design the reactors so that portions of each half cycle of the alternating current through the load windings are sufficient to bring the cores into saturation. This saturation method causes the cores to cycle between a saturated state and an unsaturated state, thus causing the resistance to alternating current of the load windings to cycle between a very high level and a very low level close to zero. The other method of bringing the cores into saturation is to apply a direct current to the control windings which is itself sufficient to saturate the cores. As long as such direct current is being applied, the cores remain saturated, and the effective resistance to the alternating current in the load windings remains close to zero.

The present invention uses a combination of the above two methods of saturating cores 31 and 33. Firstly, cores 31 and 33 are designed so that they are very easily saturated, thus allowing the load current passing through load windings 23 and 25 to maintain cores 31 and 33 in saturation for a majority of each current cycle. Secondly, control windings 27 and 29 are provided to allow selective application of direct current to the cores sufficient to selectively saturate cores 31 and 33.

In the preferred embodiment, switching transistor 35 is a PNP transistor with a base input, a collector input and an emitter input. The switching transistor functions merely as a switch in this embodiment. The application of a current to the base closes the switch allows current to flow between the emitter and the collector. With specific reference now to the specific circuit components, application of a binary pulse train (such as binary data stream 43) to the base of switching transistor 35 will allow current to flow in the direction of arrows 41. More specifically, switching transistor 35 is switched from the off-condition (open-condition) to the on-condition (closed-condition) to allow DC current 19 to cause current flow from the emitter to the collector of switching transistor 35, through diode 39, through control windings 27 and 29, and eventually to ground. Diodes 39 and 45 are provided merely to protect the circuitry from certain types of damage, and are not central to the concepts of the invention.

FIGS. 2A and 2B show graphs of the load current and control current, respectively, versus a given period of time. Reference to these Figures and to FIG. 1 will aid in understanding the following description of the operation of the invention.

During the period from T=0 to T=3, no control current is allowed to flow through control windings 27 and 29. Following the load current curve from T=0, the load current begins at zero. If the load current were not passing through load windings 23 and 25, the load current would rise sinusoidally as shown by the sinusoidal dotted line of FIG. 2A. However, the load current is passing through load windings 23 and 25, which are wound around unsaturated cores 31 and 33. Since cores 31 and 33 are unsaturated, the resistance to the alternating current is very high. The load current therefore lags the voltage by nearly a full 90 degrees, and is depicted by the solid line on the load current graph of FIG. 2A as being very close to zero, thus creating a "deformation" in the load current waveform.

As time progresses, the amplitude of the alternating current increases above a saturation threshold ($I_{sat}$) and the cores reach a state of saturation. When the cores saturate, the resistance in the load windings 23 and 25 becomes very small. As the resistance in the load windings essentially disappears, the load current returns in phase with the voltage and is depicted by the solid line in FIG. 2A as jumping up to its normal sinusoidal waveform. As long as the load current remains sufficiently high to maintain the cores in saturation, the load current follows its normal sinusoidal waveform. At T=1, the load current peaks and then begins to decrease. At some point between T=1 and T=2, the amplitude of the alternating current drops below the saturation threshold ($I_{sat}$) and the cores become unsaturated, and the load current again lags behind the voltage by 90° and is shown in FIG. 2A as returning to around zero.

At T=2, if the load current were not passing through load windings 23 and 25, it would begin to increase in the negative direction along the sinusoidal dotted line of FIG. 2A. However, since it is passing through load windings 23 and 25, and cores 31 and 33 are now unsaturated, the resistance in the load windings is high, and the load current will thus remain near zero, or, as stated above, lag behind the voltage by 90°, and thus create a "deformation" in the load current waveform. Between T=2 and T=3, the cores will once again saturate, and the load current will return in phase with the voltage and jump down along the solid line, and resume its normal sinusoidal waveform.

As just described, the saturable cores going into and out of saturation due to the sinusoidal waveform of the load current result in "deformations" being formed in the load current waveform at around the zero crossings.

At T=3, the control current is allowed to flow through control windings 27 and 29. This control current is sufficient, in and by itself, to maintain the cores in saturation. Since the cores are being maintained in saturation by the control current, the resistance in the load windings remains very low even as the load current passes through the zero crossings at T=4 and T=6. As a result of the control current maintaining the cores in saturation, the sinusoidal waveform of the load current from T=3 to T=7 is unaltered.

At T=7, the control current is turned off and no longer allowed to flow through control windings 27 and 29. Therefore, as the load current approaches the zero crossings at T=8 and T=10, the cores will become unsaturated, and the load current will again lag the voltage by 90°, thus dropping to near zero around those zero crossings and creating a "deformation" in the sinusoidal waveform.

Reference numerals 60a–60f indicate the time periods during which cores 31 and 33 are unsaturated. Reference numerals 62a–62e indicate the time periods during which cores 31 and 33 are saturated.

As illustrated in FIGS. 2A and 2B, by selectively applying a control current through control windings 27 and 29, it is possible to selectively prevent "deformations" from being formed at the zero crossings of the load current waveform.

If the control current through control windings 27 and 29 is selectively applied to represent the binary data stream 43, then the "deformations" created in the load current waveform will be representative of the binary data stream 43. These "deformations" can then be read at the surface and converted into a binary data stream identical to binary data stream 43.

In accordance with the present invention, remotely located sensing instruments in sensor package 53 monitor a variety of conditions, such as temperature, pressure, and the performance of subsurface equipment, such as motor 15. The output of the sensors in the sensor package 53 is digitized and multiplexed, and provided as a binary data stream 43. The data stream 43 actuates the transistor switch 35 to allow the selective passage of current 41 through control windings 27 and 29 which are disposed about cores 31 and 33.

In the preferred embodiment of the present invention, the ratio of control windings to load windings is ten to one, thus allowing relatively small changes in the control windings to produce correspondingly large changes in the output of the load windings. It is also important to note that load windings 23 and 25 are connected in series, but out of phase, so that the impact of the passage of current therethrough results in a cancellation effect, so as to practically eliminate any undesirable AC current transfer from the load windings 23 and 25 to the control windings 27 and 29.

Once the data has been impressed onto the power signal travelling through power cable 11, the data must be read at the surface. Current transformer 49 is magnetically coupled to the leg of the three-phase power cable 11 onto which the data was impressed. The current transformer 49 is connected to data receiving circuits 51. Data receiving circuits 51 use well-known digital or analog techniques to analyze the current waveform and detect "deformations" in the signal at around the zero crossing. Any number of techniques can be used with the end result being the detection of the "deformations" in the power signal. The presence or absence of "deformations" in the signal is used to represent the "1"'s or "0"'s of the serial data being transmitted.

Figure 4:
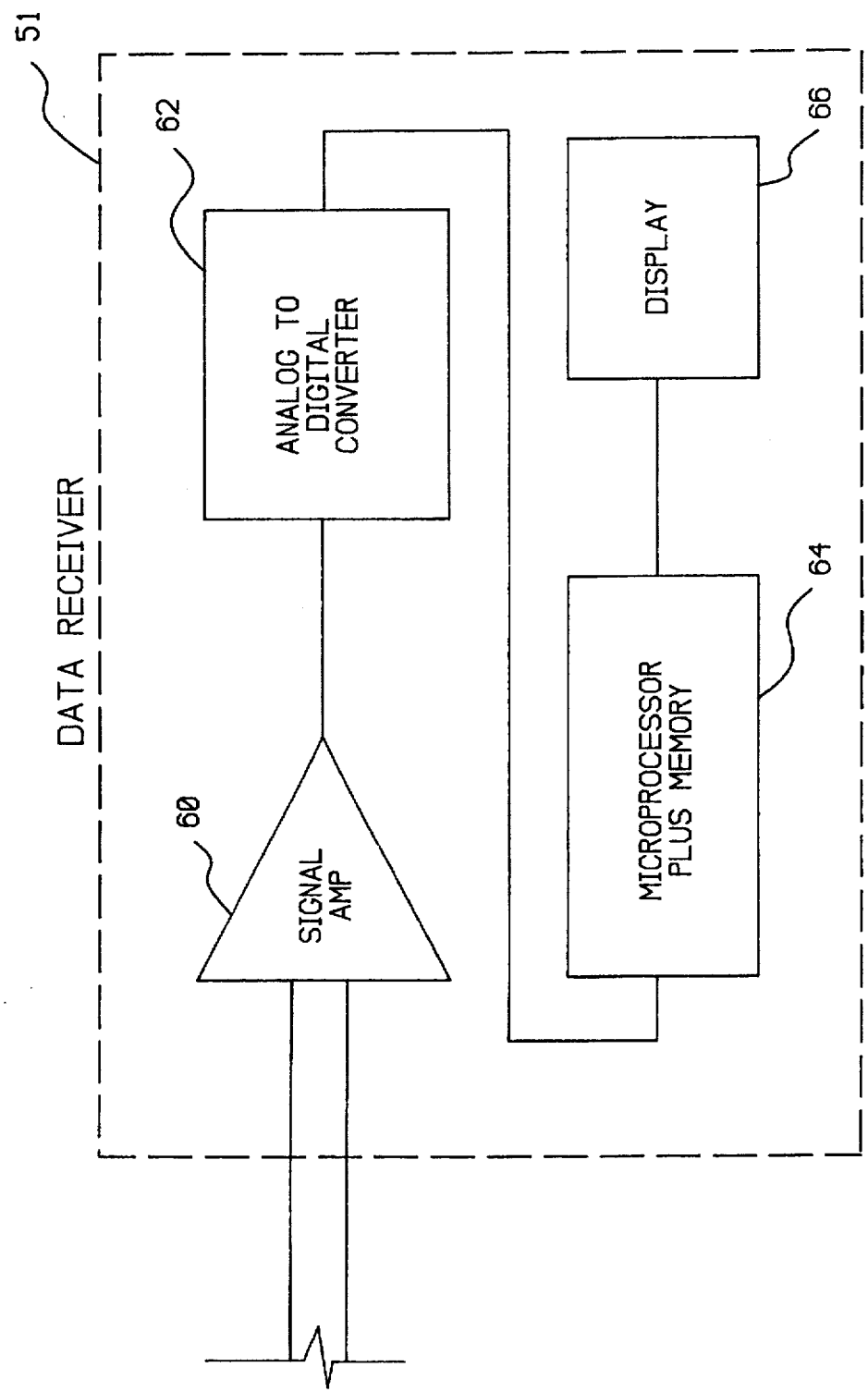
FIG. 4 is a block diagram of the data receiver circuit.

FIG. 4 shows a block diagram of a circuit that could be used to detect the "deformations" at the zero crossing. A signal amplifier 60 amplifies the signal being received from current transformer 49. An analog to digital converter 62 then converts the analog signal into a digital signal which is fed into a microprocessor and memory unit 64. The microprocessor 64 processes the signal, and with the help of software, samples and analyzes the signal to detect "deformations" in the signal. The microprocessor 64 then converts the absence and presence of "deformations" into a data stream that corresponds to data stream 43 and that can be displayed through display 66.

Figure 3:
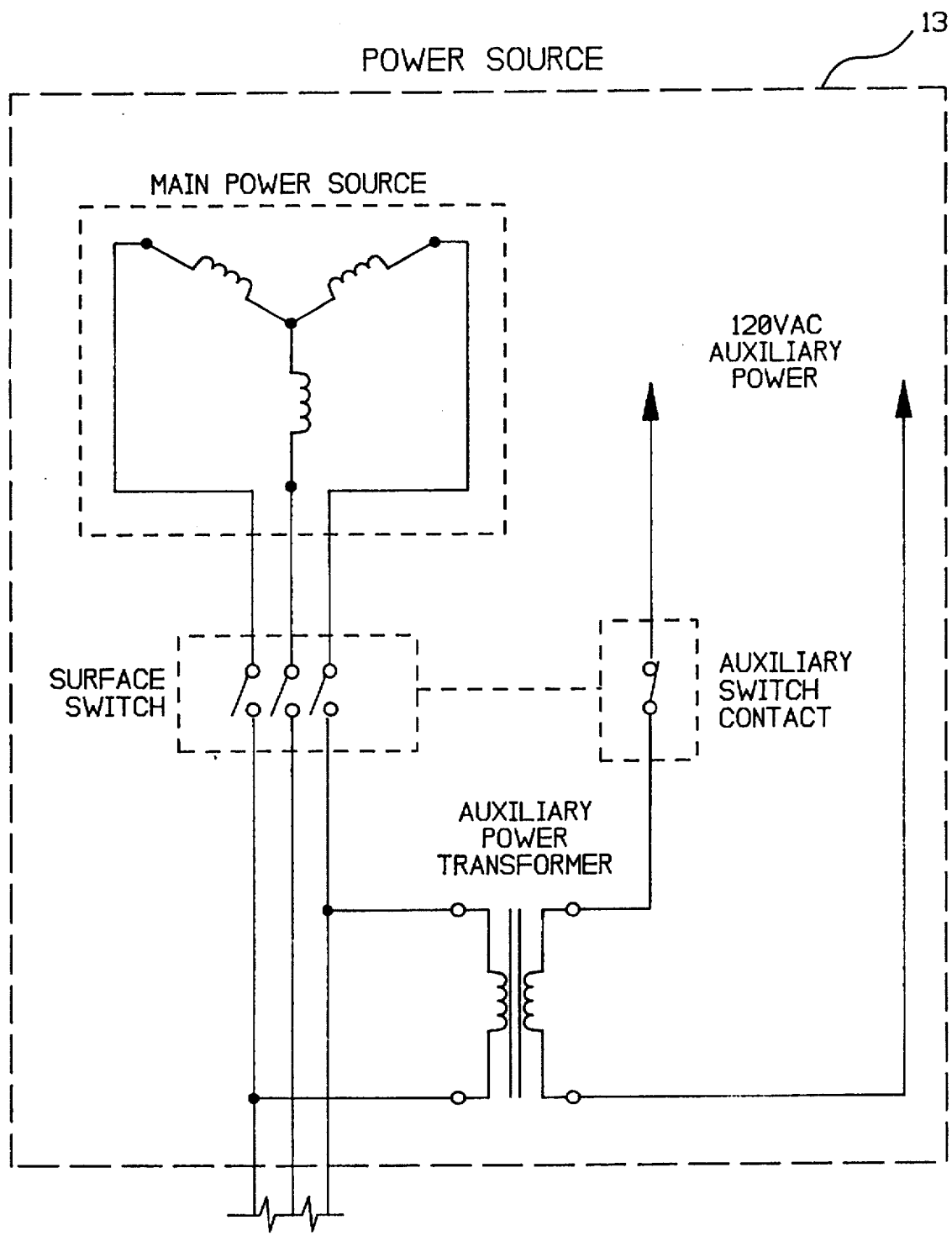
FIG. 3 is a schematic of the power source.

FIG. 3 shows a schematic of a power source that could be used in the present invention. Any adequate three-phase power source can be used. One feature shown in FIG. 3 is the presence of an auxiliary power source which can be connected in any one of several ways so as to provide auxiliary power in the event that the main power source should fail.

Although saturable core reactors can take on many forms, FIGS. 5A–5D illustrate one embodiment of a saturable core reactor. The exact size and other design parameters of a saturable core reactor for use in the present invention must be such that the passage of alternating current through load windings 23 and 25 easily saturate the cores so that the cores remain in saturation for the majority of the alternating current waveform. The shorter amount of time the cores remain unsaturated, the smaller the "deformations" will be, and the less the load current waveform is deformed. The less the load current is deformed, the fewer negative effects will be felt by motor 15. However, the smaller the "deformations" are, the harder it is to detect them reliably. Therefore, a balance must be achieved that will result in a waveform that is not altered enough to seriously effect the operation of motor 15, but that is altered enough to allow reliable detection of the "deformations" by data receiver circuits 51. This balance will in large part be based on the particular application for which the present invention is being used.

If the present invention is to be used in an oilfield industry application, where the power cable 11 is being used to power a 60 ampere motor 15, and the sensor package 53 is being used to measure such data as pressure and other downhole information, the construction and dimensions of the saturable core reactor discussed below have been found to work well.

Figures 5A, 5B:
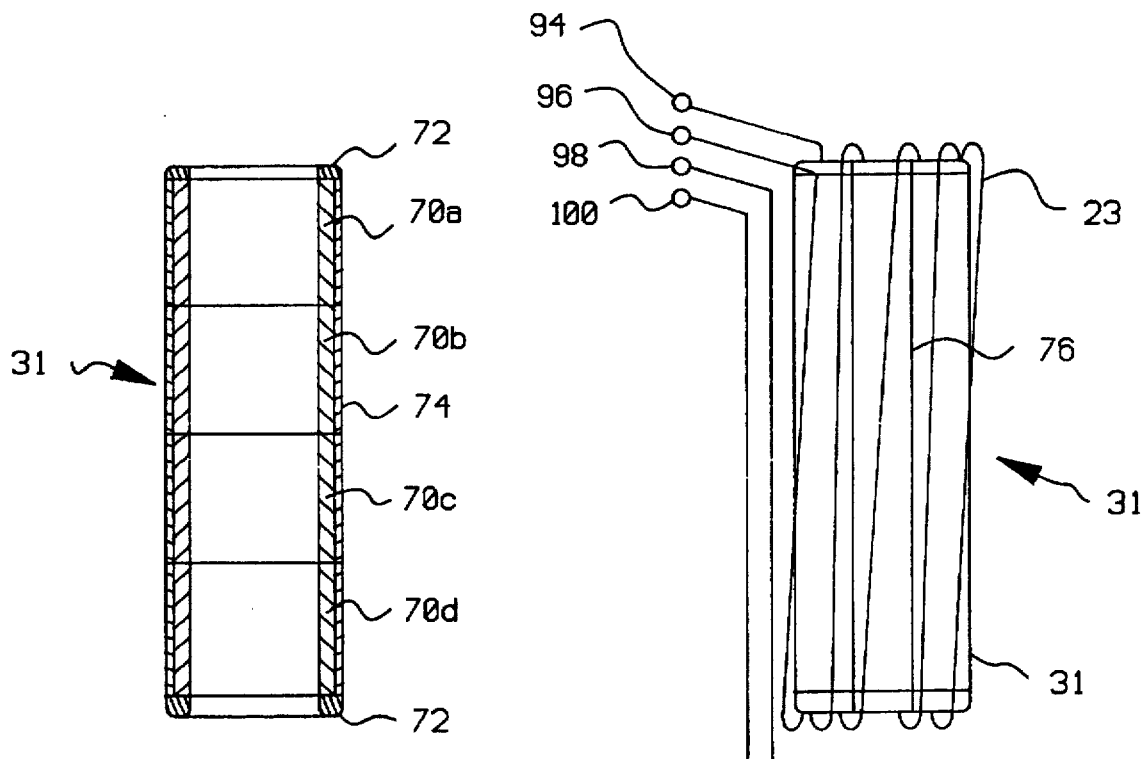
FIG. 5A is a cross sectional view of the two saturable cores taken along a vertical section through the middle of the core.
FIG. 5B is a view of the two cores with the load windings shown wound around each core.

The cores shown in FIG. 5A are made up by four sections 70a, 70b, 70c, and 70d. Each cylindrical section 70 is made by winding a 2.25 inch wide strip, made of 50 percent iron and 50 percent nickel, to form a cylinder having an outer diameter of 2.75 inches, an inner diameter of 2 inches, and a height of 2.25 inches. Four sections 70 are then stacked end-to-end to form each core 31 and 33. Cores 31 and 33 are each 9 inches long. The four sections 70 are held together by taping each section 70 to the adjacent sections 70. An aluminum tube 74 is then placed around the four sections, and end washers 72 are placed at each end of tube 74. The tube 74, end washers 72, and sections 70 are kept together with a strip of tape 76 (shown in FIG. 5B).

Figure 5C:
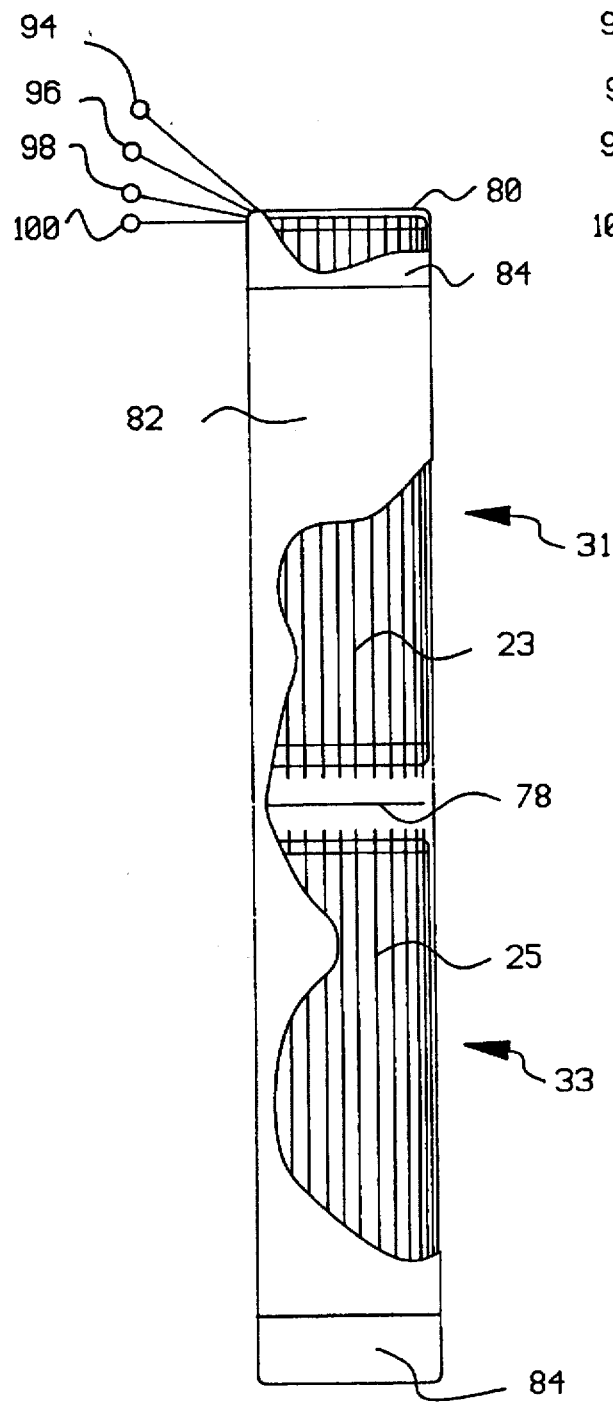
FIG. 5C is a view of the cores of FIG. 5B assembled and ready to accept the control windings.

Referring now to FIG. 5B, load windings 23 are wound around core 31, and load windings 25 are wound around core 33. Load windings 23 and 25 are made of rectangular copper wire that is 0.128 inches by 0.408 inches. The rectangular copper wire used for the load windings is wound around the cores as shown in FIG. 5B. Load windings 23 form 12 turns around core 31, and load windings 25 form 12 turns around core 33. Referring now to FIG. 5C, once the load windings 23 and 25 are wound around cores 31 and 33, cores 31 and 33 are placed end-to-end with a washer 78 made of insulation paper separating the ends of the cores 31 and 33. A washer 80 made of insulation paper (only one is visible in FIG. 5C) is also placed at the exterior end of each core. A cylindrical insulation paper outer tube 82 is placed around the cores 31 and 33 and control windings 23 and 25. A cylindrical insulation paper inner tube (not shown in FIG. 5C) is also placed in the cylindrical space inside cores 31 and 33 and windings 23 and 25. Tape 84 is then used to hold the inner and outer tubes, and the washers 80 in place around cores 31 and 33 and control windings 23 and 25.

Figure 5D:
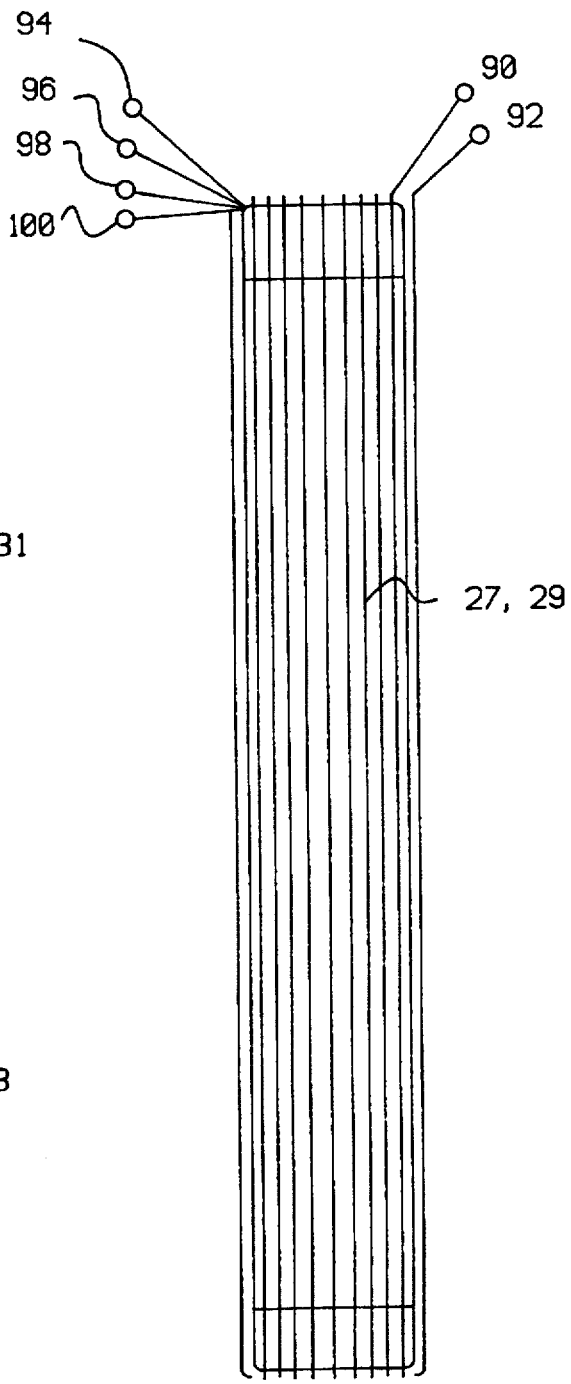
FIG. 5D is a view of the control windings wound around the two cores of FIG. 5C.

Referring now to FIG. 5D, control windings 27 and 29 are wound around the cores 31 and 33. Control windings 27 and 29 have been referred to as being two separate windings, one on core 31 and one on core 33. However, in the preferred embodiment, control windings 27 and 29 are just one single winding extending around both cores 31 and 33, as shown in FIG. 5D. Having one single winding around both cores, or one winding around each core makes no difference since the two structures are equivalent. The control windings 27 and 29 form 120 turns around cores 31 and 33. The control windings 27 and 29 are made of #12AWG copper wire.

While the invention has been shown in only one of its forms, it is not thus limited but is susceptible to various changes and modifications without departing from the spirit thereof.

What is claimed is:

1. A data transmission apparatus for transmitting data over a power cable which supplies alternating electrical current to an electrical-power-consuming component, comprising:
 a. at least one reactive circuit component, each including:
  (1) a highly magnetically-permeable core defining a magnetic flux pathway;
  (2) load windings wound about a portion of said highly magnetically-permeable core for receiving at least a portion of said alternating electrical current from said power cable;
  (3) control windings wound about a portion of said highly magnetically-permeable core;
 b. a control circuit for selectively communicating a data signal to said control windings;
 c. said data transmission apparatus being operable in a plurality of modes of operation, including:
  (1) a saturated mode of operation wherein said highly magnetically-permeable core is in a magnetically saturated condition and provides a low impedance to alternating current flow; and
  (2) an unsaturated mode of operation wherein said highly magnetically-permeable core is in a magnetically unsaturated condition and provides a high impedance to said alternating current flow;
 d. wherein said data is transmitted to a remote location through said power cable by deforming said alternating electrical current in a region associated with selected waveform zero-crossings in a predefined manner by switching between said saturated mode of operation and said unsaturated mode of operation in response to said data signal.

2. A data transmission apparatus according to claim 1, including two reactive circuit components coupled in series but out of phase to minimize power transfer from said load windings to said control windings.

3. A data transmission apparatus according to claim 1, wherein said alternating electrical current comprises a multi-phase power source, and wherein said load windings of said at least one reactive circuit component communicate with at least one leg of said multi-phase power source.

4. A data transmission apparatus according to claim 1, further comprising:
 a receiver member remotely located from said at least one reactive circuit component for identifying alteration of said at least one electrical characteristic of said alternating electrical current and reconstructing said data signal.

5. A data transmission apparatus according to claim 1, wherein said control circuit includes a switch member responsive to said data signal for selectively applying a direct current to said control windings to switch said data transmission apparatus to said saturated mode of operation.

6. A data transmission apparatus according to claim 1, wherein said highly magnetically-permeable core is adapted to switch to said saturated mode of operation at a saturation current which is intermediate zero current and a peak current for said alternating electrical current so that passage of said alternating electrical current through said load windings switches said data transmission apparatus between said saturated mode of operation and said unsaturated mode of operation.

7. A data transmission apparatus for transmitting data over a power cable which supplies alternating electrical current to an electrical-power-consuming component, comprising:
 a. at least one reactive circuit component, each including:
  (1) a highly magnetically-permeable core defining a magnetic flux pathway;
  (2) load windings wound about a portion of said highly magnetically-permeable core for receiving at least a portion of said alternating electrical current from said power cable;
  (3) control windings wound about a portion of said highly magnetically-permeable core;

b. a control circuit for selectively communicating a data signal to said control windings;

c. said data transmission apparatus being operable in a plurality of modes of operation, including:
   (1) a saturated mode of operation wherein said highly magnetically-permeable core is in a magnetically saturated condition and provides a low impedance to alternating current flow; and
   (2) an unsaturated mode of operation wherein said highly magnetically-permeable core is in a magnetically unsaturated condition and provides a high impedance to said alternating current flow;

d. wherein said alternating electrical current passing through said load windings switches said data transmission apparatus (a) to said saturated mode of operation at high current levels and (b) to said unsaturated mode of operation at low current levels, causing distortions at zero crossings of said alternating electrical current;

e. wherein a control signal current which is selectively supplied to said control windings is sufficient to maintain said data transmission apparatus in said saturated mode of operation at high current levels but not at low current levels;

f. wherein said data is transmitted to a remote location through said power cable through distortions of said alternating electrical current in a predefined manner by switching between said saturated mode of operation and said unsaturated mode of operation in response to said data signal.

8. A data transmission apparatus according to claim 7, including two reactive circuit components coupled in series but out of phase to minimize power transfer from said load windings to said control windings.

9. A data transmission apparatus according to claim 7, wherein said alternating electrical current comprises a multiphase power source, and wherein said load windings of said at least one reactive circuit component communicates with at least one leg of said multi-phase power source.

10. A data transmission apparatus according to claim 7, further comprising:
   a receiver member remotely located from said at least one reactive circuit component for identifying distortions of said alternating electrical current and reconstructing said data signal.

11. A data transmission apparatus according to claim 7, wherein said control circuit includes a switch member responsive to said data signal for selectively applying a direct current to said control windings to switch said data transmission apparatus to said saturated mode of operation.

12. A data transmission apparatus according to claim 7, wherein said highly magnetically-permeable core is adapted to switch to said saturated mode of operation at a saturation current which is intermediate zero current and a peak current for said alternating electrical current so that passage of said alternating electrical current through said load windings switches said data transmission apparatus between said saturated mode of operation and said unsaturated mode of operation.

13. A method of transmitting data over a power cable which supplies alternating electrical current to an electrical-power-consuming component, comprising the method steps of:
   a. providing at least one reactive circuit component, each including:
      (1) a highly magnetically-permeable core defining a magnetic flux pathway;
      (2) load windings wound about a portion of said highly magnetically-permeable core for receiving at least a portion of said alternating electrical current from said power cable;
      (3) control windings wound about a portion of said highly magnetically-permeable core;
   b. providing a control circuit for selectively communicating a data signal to said control windings;
   c. switching said data transmission apparatus between the following plurality of modes in response to said data signal:
      (1) a saturated mode of operation wherein said highly magnetically permeable core is in a magnetically saturated condition and provides a low impedance to alternating current flow; and
      (2) an unsaturated mode of operation wherein said highly magnetically-permeable core is in a magnetically unsaturated condition and provides a high impedance to said alternating current flow;
   d. transmitting said data to a remote location by deforming said alternating electrical current in a region associated with selected waveform zero-crossings in a predefined manner by switching between said saturated mode of operation and said unsaturated mode of operation in response to said data signal.

14. A data transmission apparatus for transmitting data over a power cable which supplies alternating electrical current to an electrical-power consuming component, comprising:
   a. two reactive circuit components coupled in series but out of phase to minimize power transfer from load windings of said each reactive circuit component to control windings of said each reactive circuit component, said each reactive circuit component including:
      (1) a highly magnetically-permeable core defining a magnetic flux pathway;
      (2) said load windings wound about a portion of said highly magnetically-permeable core for receiving at least a portion of said alternating electrical current from said power cable;
      (3) said control windings of said each reactive circuit component wound about a portion of said highly magnetically-permeable core
   b. a control circuit for selectively communicating a data signal to said control windings of said each reactive circuit component;
   c. said data transmission apparatus being operable in a plurality of modes of operation, including:
      (1) a saturated mode of operation wherein said highly magnetically-permeable core is in a magnetically saturated condition and provides low impedance to alternating current flow; and
      (2) an unsaturated mode of operation wherein said highly magnetically-permeable core is in magnetically unsaturated condition and provides a high impedance to said alternating current flow;
   d. wherein said data is transmitted to a remote location through said power cable by deforming said alternating electrical current in a region associated with selected waveform zero-crossings in a predefined manner by switching between said saturated mode of operation and said unsaturated mode of operation in response to said data signal.

15. A data transmission apparatus according to claim 14, wherein said alternating electrical current comprises a multiphase power source, and wherein said load windings of said each reactive circuit component communicate with at least one leg of said multi-phase power source.

16. A data transmission apparatus according to claim 14, further comprising:

a receiver member remotely located from said two reactive circuit component for identifying said alteration of said at least one electrical characteristic of said alternating electrical current and reconstructing said data signal.

17. A data transmission apparatus according to claim 14, wherein said control circuit includes a switch member responsive to said data signal for selectively applying a direct current to said control windings of said each reactive circuit component to switch said data transmission apparatus to said saturated mode of operation.

18. A data transmission apparatus according to claim 14, wherein said highly magnetically-permeable core is adapted to switch to said saturated mode of operation at a saturation current which is intermediate zero current and a peak current for said alternating electrical current so that passage of said alternating electrical current through said load windings switches said data transmission apparatus between said saturated mode of operation and said unsaturated mode of operation.

19. A data transmission apparatus for transmitting data over a power cable which supplies alternating electrical current to an electrical-power-consuming component, comprising:

a. at least one reactive circuit component, each including:
  (1) a highly magnetically-permeable core defining a magnetic flux pathway;
  (2) load windings wound about a portion of said highly magnetically-permeable core for receiving at least a portion of said alternating electrical current from said power cable;
  (3) control windings wound about a portion of said highly magnetically-permeable core;

b. a control circuit for selectively communicating a data signal to said control windings, said control circuit including a switch member responsive to said data signal for selectively applying a direct current to said control windings;

c. said data transmission apparatus being operable in a plurality of modes of operation, including:
  (1) a saturated mode of operation wherein said switch member applies said direct current to said control windings thereby putting said highly magnetically-permeable core into a magnetically saturated condition which provides a low impedance to alternating current flow; and
  (2) an unsaturated mode of operation wherein said highly magnetically-permeable core is in a magnetically unsaturated condition and provides a high impedance to said alternating current flow;

d. wherein said data is transmitted to a remote location through said power cable by deforming said alternating electrical current in a region associated with selected waveform zero-crossings in a predefined manner by switching between said saturated mode of operation and said unsaturated mode of operation in response to said data signal.

20. A data transmission apparatus according to claim 19, including two reactive circuit components coupled in series but out of phase to minimize power transfer from said load windings to said control windings.

21. A data transmission apparatus according to claim 19, wherein said alternating electrical current comprises a multi-phase power source, and wherein said load windings of said at least one reactive circuit component communicates with at least one leg of said multi-phase power source.

22. A data transmission apparatus according to claim 19, further comprising:

a receiver member remotely located from said at least one reactive circuit component for identifying said alteration of said at least one electrical characteristic of said alternating electrical current and reconstructing said data signal.

23. A data trasmission apparatus according to claim 19, wherein said highly magnetically-permeable core is adapted to switch to said saturated mode of operation at a saturation current which is intermediate zero current and a peak current for said alternating electrical current so that passage of said alternating electrical current through said load windings swithches said data transmission apparatus between said saturated mode of operation and said unsaturated mode of operation.

24. A data transmission apparatus for transmitting data over a power cable which supplies alternating electrical current to an electrical-power-consuming component, comprising:

a. at least two reactive circuit components, each including:
  (1) a highly magnetically-permeable core defining a magnetic flux pathway;
  (2) load windings wound about a portion of said highly magnetically-permeable core for receiving at least a portion of said alternating electrical current from said power cable;
  (3) control windings wound about a portion of said highly magnetically-permeable core; wherein said at least two reactive circuit components being coupled in series but out of phase to minimize power transfer from said load windings of said at least two reactive circuit components to said control windings of said at least two reactive circuit components;

b. a control circuit for selectively communicating a data signal to said control windings of said at least two reactive circuit components;

c. said data transmission apparatus being operable in a plurality of modes of operation, including:
  (1) a saturated mode of operation wherein said highly magnetically-permeable core is in a magnetically saturated condition and provides a low impedance to alternating current flow; and
  (2) an unsaturated mode of operation wherein said highly magnetically-permeable core is in a magnetically unsaturated condition and provides a high impedance to said alternating current flow;

d. wherein said alternating electrical current passing through said load windings of said at least two reactive circuit components switches said data transmission apparatus (a) to said saturated mode of operation at high current levels and (b) to said unsaturated mode of operation at low current levels, causing distortions at zero crossings of said alternating electrical current;

e. wherein a control current which is selectively supplied to said control windings of said at least two reactive circuit components is sufficient to maintain said data transmission apparatus in said saturated mode of operation at high current levels but not at low current levels;

f. wherein said data is transmitted to a remote location through said power cable through distortions of said alternating electrical current in a predefined manner by switching between said saturated mode of operation and said unsaturated mode of operation in response to said data signal.

25. A data transmission apparatus according to claim 24, wherein said alternating electrical current comprises a multi-phase power source, and wherein said load windings of said at least two reactive circuit components communicate with at least one leg of said multi-phase power source.

26. A data transmission apparatus according to claim 24, further comprising:

a receiver member remotely located from said at least two reactive circuit components for identifying said distortions of said alternating electrical current and reconstructing said data signal.

27. A data transmission apparatus according to claim 24, wherein said control circuit includes a switch member responsive to said data signal for selectively applying a direct current to said control windings of said at least two reactive circuit components to switch said data transmission apparatus to said saturated mode of operation.

28. A data transmission apparatus according to claim 24, wherein said highly magnetically-permeable core is adapted to switch to said saturated mode of operation at a saturation current which is intermediate zero current and a peak current for said alternating electrical current so that passage of said alternating electrical current through said load windings of said at least two reactive circuit components switches said data transmission apparatus between said saturated mode of operation and said unsaturated mode of operation.

29. A data transmission apparatus for transmitting data over a power cable which supplies alternating electrical current to an electrical-power-consuming component, comprising:

a. at least one reactive circuit component, each including:
 (1) a highly magnetically-permeable core defining a magnetic flux pathway;
 (2) load windings wound about a portion of said highly magnetically-permeable core for receiving at least a portion of said alternating electrical current from said power cable;
 (3) control windings wound about a portion of said highly magnetically-permeable core;
b. a control circuit for selectively communicating a data signal to said control windings, said control circuit including a switch member responsive to said data signal for selectively applying a direct current to said control windings;
c. said data transmission apparatus being operable in a plurality of modes of operation, including:
 (1) a saturated mode of operation wherein said switch member applies said direct current to said control windings thereby putting said highly magnetically-permeable core into a magnetically saturated condition which provides a low impedance to alternating current flow; and
 (2) an unsaturated mode of operation wherein said highly magnetically-permeable core is in a magnetically unsaturated condition and provides a high impedance to said alternating current flow;
d. wherein said alternating electrical current passing through said load windings switches said data transmission apparatus (a) to said saturated mode of operation at high current levels and (b) to said unsaturated mode of operation at low current levels, causing distortions at zero crossings of said alternating electrical current;
e. wherein a control current which is selectively supplied to said control windings is sufficient to maintain said data transmission apparatus in said saturated mode of operation at high current levels but not at low current levels;
f. wherein said data is transmitted to a remote location through said power cable through distortions of said alternating electrical current in a predefined manner by switching between said saturated mode of operation and said unsaturated mode of operation in response to said data signal.

30. A data transmission apparatus according to claim 29, including two reactive circuit components coupled in series but out of phase to minimize power transfer from said load windings to said control windings.

31. A data transmission apparatus according to claim 29, wherein said alternating electrical current comprises a multi-phase power source, and wherein said load windings of said at least one reactive circuit component communicates with at least one leg of said multi-phase power source.

32. A data transmission apparatus according to claim 29, further comprising:

a receiver member remotely located from said at least one reactive circuit component for identifying distortions of said alternating electrical current and reconstructing said data signal.

33. A data transmission apparatus according to claim 29, wherein said control circuit includes a switch member responsive to said data signal for selectively applying said direct current to said control windings of said at least two reactive circuit components to switch said data transmission apparatus to said saturated mode of operation.

34. A data transmission apparatus according to claim 29, wherein said highly magnetically-permeable core is adapted to switch to said saturated mode of operation at a saturation current which is intermediate zero current and a peak current for said alternating electrical current so that passage of said alternating electrical current through said load windings switches said data transmission apparatus between said saturated mode of operation and said unsaturated mode of operation.

35. A data transmission apparatus for transmitting data over a power cable which supplies alternating electrical current to an electrical-power-consuming component, comprising:

a. at least two reactive circuit components coupled in series but out of phase to minimize power transfer from load windings of said each reactive circuit component to control windings of said each reactive circuit component, said each reactive circuit component including:
 (1) a highly magnetically-permeable core defining a magnetic flux pathway;
 (2) load windings wound about a portion of said highly magnetically-permeable core for receiving at least a portion of said alternating electrical current from said power cable;
 (3) said control windings wound about a portion of said highly magnetically-permeable core;
b. a control circuit for selectively communicating a data signal to said control windings;
c. said data transmission apparatus being operable in a plurality of modes of operation, including:
 (1) a saturated mode of operation wherein said highly magnetically-permeable core is in a magnetically saturated condition and provides a low impedance to alternating current flow; and (2) an unsaturated mode of operation wherein said highly magnetically-permeable core is in a magnetically unsaturated condition and provides a high impedance to said alternating current flow;

d. wherein said data is transmitted to a remote location through said power cable through alteration of at least one electrical characteristic of said alternating electrical current in a predefined manner by switching between said saturated mode of operation and said unsaturated mode of operation in response to said data signal.

36. A data transmission apparatus according to claim 35, wherein said at least one electrical characteristic utilized to transmit said data to said remote location comprises a deformation of said alternating electrical current at selected waveform zero-crossings.

37. A data transmission apparatus according to claim 35, wherein said alternating electrical current comprises a multi-phase power source, and wherein said load windings of said at least two reactive circuit components communicate with at least one leg of said multi-phase power source.

38. A data transmission apparatus according to claim 35, further comprising:

a receiver member remotely located from said at least two reactive circuit components for identifying alteration of said at least one electrical characteristic of said alternating electrical current and reconstructing said data signal.

39. A data transmission apparatus according to claim 35, wherein said control circuit includes a switch member responsive to said data signal for selectively applying a direct current to said control windings to switch said data transmission apparatus to said saturated mode of operation.

40. A data transmission apparatus according to claim 35, wherein said highly magnetically-permeable core is adapted to switch to said saturated mode of operation at a saturation current which is intermediate zero current and a peak current for said alternating electrical current so that passage of said alternating electrical current through said load windings switches said data transmission apparatus between said saturated mode of operation and said unsaturated mode of operation.

41. A data transmission apparatus for transmitting data over a power cable which supplies alternating electrical current to an electrical-power-consuming component, comprising:

a. at least two reactive circuit components coupled in series but out of phase to minimize power transfer from said load windings to said control windings, each including:

(1) a highly magnetically-permeable core defining a magnetic flux pathway;

(2) load windings wound about a portion of said highly magnetically-permeable core for receiving at least a portion of said alternating electrical current from said power cable;

(3) control windings wound about a portion of said highly magnetically-permeable core;

b. a control circuit for selectively communicating a data signal to said control windings;

c. said data transmission apparatus being operable in a plurality of modes of operation, including:

(1) a saturated mode of operation wherein said highly magnetically-permeable core is in a magnetically saturated condition and provides a low impedance to alternating current flow; and (2) an unsaturated mode of operation wherein said highly magnetically-permeable core is in a magnetically unsaturated condition and provides a high impedance to said alternating current flow;

d. wherein said alternating electrical current passing through said load windings switches said data transmission apparatus (a) to said saturated mode of operation at high current levels and (b) to said unsaturated mode of operation at low current levels, causing distortions at zero crossings of said alternating electrical current;

e. wherein a control signal current which is selectively supplied to said control windings is sufficient to maintain said data transmission apparatus in said saturated mode of operation at high current levels but not at low current levels;

f. wherein said data is transmitted to a remote location through said power cable through distortions of said alternating electrical current in a predefined manner by switching between said saturated mode of operation and said unsaturated mode of operation in response to said data signal.

42. A data transmission apparatus according to claim 41, wherein said alternating electrical current comprises a multi-phase power source, and wherein said load windings of said at least two reactive circuit component communicate with at least one leg of said multi-phase power source.

43. A data transmission apparatus according to claim 41, further comprising:

a receiver member remotely located from said at least two reactive circuit component for identifying said distortions of said alternating electrical current and reconstructing said data signal.

44. A data transmission apparatus according to claim 41, wherein said control circuit includes a switch member responsive to said data signal for selectively applying a direct current to said control windings to switch said data transmission apparatus to said saturated mode of operation.

45. A data transmission apparatus according to claim 41, wherein said highly magnetically-permeable core is adapted to switch to said saturated mode of operation at a saturation current which is intermediate zero current and a peak current for said alternating electrical current so that passage of said alternating electrical current through said load windings switches said data transmission apparatus between said saturated mode of operation and said unsaturated mode of operation.

46. A method of communicating information in a wellbore, comprising the method steps of:

providing a string of wellbore tubular members;

providing an electrical submersible pump;

providing a data transmitter member;

providing a data receiver member;

providing an electric power supply, said electric power supply residing at the surface of the earth;

providing a power cable;

lowering said electric submersible pump, said power cable, and said data transmitter member into said wellbore on said string of wellbore tubular members;

supplying power from said electric power supply to said electric submersible pump using said power cable;

utilizing said electric submersible pump to lift fluids from said wellbore to the surface through said string of wellbore tubular members; and transmitting data from said data transmitter member to said data receiver member using said power cable, wherein:

said data transmitter member contains:
a. at least one reactive circuit component, each including:
(1) a highly magnetically-permeable core defining a magnetic flux pathway;
(2) control windings wound about a portion of said highly magnetically-permeable core;
b. a control circuit for selectively communicating a data signal to said control windings;
said data transmitter member operates in a plurality of modes of operation, including:
a. a saturated mode of operation wherein said highly magnetically-permeable core is in a magnetically saturated condition and provides a low impedance to alternating current in said power cable; and
b. an unsaturated mode of operation wherein said highly magnetically-permeable core is in a magnetically unsaturated condition and provides a high impedance to said alternating current in said power cable; and wherein said data signal is transmitted to said data receiver member through said power cable by altering at least one electrical characteristic of said alternating electrical current in a predefined manner by switching between said saturated mode of operation and said unsaturated mode of operation in response to said data signal.

47. A method of communicating information in a wellbore, comprising the method steps of:
providing a string of wellbore tubular members;
providing an electrical submersible pump;
providing a data transmitter member;
providing a data receiver member;
providing an electric power supply, said electric power supply residing at the surface of the earth;
providing a power cable;
lowering said electric submersible pump, said power cable, and said data transmitter member into said wellbore on said string of wellbore tubular members;
supplying power from said electric power supply to said electric submersible pump using said power cable;
utilizing said electric submersible pump to lift fluids from said wellbore to the surface through said string of wellbore tubular members; and
transmitting data from said data transmitter member to said data receiver member using said power cable, wherein:
said data transmitter member contains:
a. at least one reactive circuit component, each including:
(1) a highly magnetically-permeable core defining a magnetic flux pathway;
(2) control windings wound about a portion of said highly magnetically-permeable core;
b. a control circuit for selectively communicating a data signal to said control windings;
said data transmitter member operates in a plurality of modes of operation, including:
a. a saturated mode of operation wherein said highly magnetically-permeable core is in a magnetically saturated condition and provides a low impedance to alternating current in said power cable; and
b. an unsaturated mode of operation wherein said highly magnetically-permeable core is in a magnetically unsaturated condition and provides a high impedance to said alternating current in said power cable; and wherein said data signal is transmitted to said data receiver member through said power cable by altering said alternating electrical current in a region associated with selected waveform zero-crossings in a predefined manner by switching between said saturated mode of operation and said unsaturated mode of operation in response to said data signal.

48. A method of communicating information in a wellbore, comprising the method steps of:
providing a string of wellbore tubular members;
providing an electrical submersible pump;
providing a data transmitter member;
providing a data receiver member;
providing an electric power supply, said electric power supply residing at the surface of the earth;
providing a power cable;
lowering said electric submersible pump, said power cable, and said data transmitter member into said wellbore on said string of wellbore tubular members;
supplying power from said electric power supply to said electric submersible pump using said power cable;
utilizing said electric submersible pump to lift fluids from said wellbore to the surface through said string of wellbore tubular members; and
transmitting data from said data transmitter member to said data receiver member using said power cable, wherein:
said data transmitter member contains:
a. at least two reactive circuit components coupled in series but out of phase to minimize power transfer from load windings of said each reactive circuit component to control windings of said each reactive circuit component, said each reactive circuit component including:
(1) a highly magnetically-permeable core defining a magnetic flux pathway;
(2) control windings wound about a portion of said highly magnetically-permeable core;
b. a control circuit for selectively communicating a data signal to said control windings;
said data transmitter member operates in a plurality of modes of operation, including:
a. a saturated mode of operation wherein said highly magnetically-permeable core is in a magnetically saturated condition and provides a low impedance to alternating current in said power cable; and
b. an unsaturated mode of operation wherein said highly magnetically-permeable core is in a magnetically unsaturated condition and provides a high impedance to said alternating current in said power cable; and wherein said data signal is transmitted to said data receiver member through said power cable by altering at least one electrical characteristic of said alternating electrical current in a predefined manner by switching between said saturated mode of operation and said unsaturated mode of operation in response to said data signal.

* * * * *